US008132095B2

(12) United States Patent
Seolas et al.

(10) Patent No.: US 8,132,095 B2
(45) Date of Patent: Mar. 6, 2012

(54) AUDITING A WEBSITE WITH PAGE SCANNING AND RENDERING TECHNIQUES

(75) Inventors: Robert K. Seolas, Alpine, UT (US); John Pestana, Orem, UT (US); J. Tyler Broadbent, Lehi, UT (US); Richard A. Zinn, Murrieta, CA (US)

(73) Assignee: ObservePoint LLC, Provo, UT (US)

( * ) Notice: Subject to any disclaimer, the term of this patent is extended or adjusted under 35 U.S.C. 154(b) by 0 days.

(21) Appl. No.: 12/611,058

(22) Filed: Nov. 2, 2009

(65) Prior Publication Data

US 2011/0078557 A1 Mar. 31, 2011

Related U.S. Application Data

(60) Provisional application No. 61/110,604, filed on Nov. 2, 2008, provisional application No. 61/110,603, filed on Nov. 2, 2008.

(51) Int. Cl.
*G06F 17/27* (2006.01)
(52) U.S. Cl. ........ 715/234; 715/206; 715/276; 715/277; 715/734; 715/738
(58) Field of Classification Search .................. 715/206, 715/234, 276, 277, 733, 734, 738, 760
See application file for complete search history.

(56) References Cited

U.S. PATENT DOCUMENTS

| | | | | |
|---|---|---|---|---|
| 5,870,559 A * | 2/1999 | Leshem et al. | ................. | 709/224 |
| 5,896,502 A * | 4/1999 | Shieh et al. | ................... | 709/224 |
| 5,960,429 A * | 9/1999 | Peercy et al. | ................. | 709/217 |
| 5,968,125 A * | 10/1999 | Garrick et al. | ................. | 709/224 |
| 6,226,618 B1 * | 5/2001 | Downs et al. | .................... | 705/51 |
| 6,393,479 B1 * | 5/2002 | Glommen et al. | ............ | 709/224 |
| 6,594,694 B1 * | 7/2003 | Najork et al. | ................. | 709/219 |
| 6,775,405 B1 * | 8/2004 | Zhu | ................. | 382/154 |
| 6,801,906 B1 * | 10/2004 | Bates et al. | .................... | 707/707 |
| 6,963,874 B2 * | 11/2005 | Kasriel et al. | ................. | 702/180 |
| 6,976,218 B2 * | 12/2005 | Stanford-Clark | ............. | 715/744 |
| 7,171,618 B2 * | 1/2007 | Harrington et al. | ........... | 715/229 |
| 7,305,107 B2 * | 12/2007 | Harrington et al. | ........... | 382/112 |
| 7,349,867 B2 | 3/2008 | Rollins et al. | | |
| 7,546,530 B1 * | 6/2009 | Shuster et al. | ................. | 715/272 |
| 7,599,920 B1 * | 10/2009 | Fox et al. | .............................. | 1/1 |

(Continued)

OTHER PUBLICATIONS

USPTO, Office Action in U.S. Appl. No. 12/911,626 mailed Dec. 2, 2011, 28 pages.

*Primary Examiner* — Doug Hutton, Jr.
*Assistant Examiner* — Andrew Dyer
(74) *Attorney, Agent, or Firm* — Workman Nydegger

(57) ABSTRACT

An automated website analysis system includes mechanisms for automatically reviewing a website and identifying various features of the website. In one implementation, the analysis system can rely at least in part on the actual downloading and rendering of each page in the website to determine not only aspects of website content and layout, but also whether various content, such as third party objects or source code, execute as intended. Additional features include recording user input that may be required to progress past web pages where automated site mapping would ordinarily stall. The analysis system can identify various items of interest about each web page to the website owner, including web page parent/child relationships, as well as the extent to which the given page content is consistent with its metadata descriptions.

17 Claims, 5 Drawing Sheets

U.S. PATENT DOCUMENTS

| | | | |
|---|---|---|---|
| 7,657,497 B2* | 2/2010 | Nandy | 706/45 |
| 7,676,570 B2* | 3/2010 | Levy et al. | 709/224 |
| 7,765,295 B2 | 7/2010 | Anastas et al. | |
| 7,856,189 B2* | 12/2010 | Ishibashi | 399/61 |
| 2001/0014839 A1* | 8/2001 | Belanger et al. | 700/245 |
| 2003/0097429 A1* | 5/2003 | Wu et al. | 709/220 |
| 2003/0177096 A1* | 9/2003 | Trent et al. | 705/50 |
| 2003/0188194 A1* | 10/2003 | Currie et al. | 713/201 |
| 2004/0054589 A1* | 3/2004 | Nicholas et al. | 705/14 |
| 2004/0128534 A1* | 7/2004 | Walker | 713/200 |
| 2004/0268233 A1* | 12/2004 | Okumura et al. | 715/513 |
| 2005/0086643 A1* | 4/2005 | Shane | 717/124 |
| 2005/0228899 A1* | 10/2005 | Wendkos et al. | 709/232 |
| 2005/0229111 A1* | 10/2005 | Makela | 715/802 |
| 2005/0267872 A1* | 12/2005 | Galai et al. | 707/3 |
| 2006/0070022 A1* | 3/2006 | Ng et al. | 717/104 |
| 2007/0061384 A1* | 3/2007 | Harrington et al. | 707/203 |
| 2007/0130546 A1* | 6/2007 | Harris et al. | 715/854 |
| 2007/0245249 A1 | 10/2007 | Weisberg | |
| 2007/0299964 A1 | 12/2007 | Wong et al. | |
| 2008/0010142 A1 | 1/2008 | O'Brien et al. | |
| 2008/0092040 A1* | 4/2008 | Nakamura | 715/273 |
| 2008/0263005 A1* | 10/2008 | McLean et al. | 707/3 |
| 2009/0100154 A1 | 4/2009 | Stevenson et al. | |
| 2009/0204900 A1* | 8/2009 | Champion et al. | 715/738 |
| 2010/0306389 A1* | 12/2010 | Mu et al. | 709/228 |
| 2011/0035486 A1 | 2/2011 | Seolas et al. | |
| 2011/0041090 A1 | 2/2011 | Seolas et al. | |
| 2011/0119220 A1 | 5/2011 | Seolas et al. | |

* cited by examiner

AUDITING A WEBSITE WITH PAGE SCANNING AND RENDERING TECHNIQUES

CROSS-REFERENCE TO RELATED APPLICATIONS

The present invention claims the benefit of priority to U.S. Provisional Application No. 61/110,604, filed Nov. 2, 2008, entitled "GENERATING A SITE MAP WITH AUTOMATED PAGE LOADING," and to Provisional Application No. 61/110,603, filed Nov. 2, 2008, entitled "MONITORING PAGE TRACKING CODE WITH AUTOMATED PAGE RENDERING," the entire contents of which are incorporated by reference herein.

BACKGROUND OF THE INVENTION

1. The Field of the Invention

This invention relates to systems, methods, and computer program products related to analysis of websites.

2. Background and Relevant Art

Websites are becoming increasingly more common and important for organizations to convey information to their clients and/or customers. From the client or customer perspective, however, the ability to navigate a particular website, and the intuitiveness thereof, can vary widely from one website to the next. To aid such navigation, organizations will often provide a "site map," which effectively provides an index of web pages that can be found in the website. The organization might further break the index down by alphabetical listing or by topic in order to provide the greatest ease of use. This way, if a user has difficulty finding a particular web page of interest using the ordinary menu items provided through the website, the user may be able to find the web page of interest by looking through the corresponding site map.

Unfortunately, site maps can be difficult to generate and maintain for an organization. Often, generation of a site map involves use of some personnel not only to review how various web pages in the website are related, but also to prepare an accurate index page with all of the appropriate, accurate links. The links to various web pages, however, are not particularly static, and so an organization may need to continually review its index page to ensure that the links on the page are fresh and accurate. Such efforts can be particularly important as organizations move more and more to a format that uses automatically generated web pages.

Although some automated mechanisms for generating a site map exist, such mechanisms suffer from a number of difficulties. For example, if a page fails to load properly, or leads to another web page that requires human input before continuing, the system may stop its progression and thus provide an inaccurate or incomplete map. In some cases, the website owner may not even be aware of the incorrect site map, and thus takes the site map at face value.

For similar reasons, these types of errors highlight the inaccuracy of website "health" issues. For example, many organizations also now spend considerable resources to "optimize" their websites for maximum discovery and/or use by intended users or customers. Optimization best practices often involve the use of certain metatags and "tracking pixels" in the web page source code, as well as functional code that, when executed, records helpful information about a given web page and how the customer or client uses the web page, such as the web page name, access date, and user actions. Conventional mechanisms for determining website health involve merely scanning the web page source code for the presence of expected metatags, tracking pixels, or links to expected executables.

Such mechanisms, however, are prone to providing website owners with an incomplete report about website health, or otherwise indicating that the expected code is present without the added information of whether the code works as intended. For example, simply scanning the text (HTML) source code of a web page does not indicate that the source code (e.g., embedded javascript routines) will execute appropriately. In addition, scanning the web page source code text may miss dynamic content, ie: the content of other executable code that are generated by or linked to the web page and stored at (or accessed from) another location.

Accordingly, there are a number of difficulties with website auditing and review that can be addressed.

BRIEF SUMMARY OF THE INVENTION

Implementations of the present invention provide systems, methods, and computer program products configured to automatically and efficiently analyze a website, including generate a site map and performing review of the website content and function. In one implementation, a rendering system uses one or more web page review (or scan) and web page rendering techniques to identify and execute objects on web pages, including identifying and executing links between pages. The rendering system can also retrieve pre-recorded user input to progress past web pages with fill-in forms. These and other features allow the rendering system to not only generate an accurate site map for a website, if desired, but also determine important site health and optimization information about the website.

For example, In addition, a method of analyzing a website using both page scan and page rendering techniques can involve requesting one or more web pages of an identified website pursuant to generating a site map of the website. The method can also involve scanning the page code of at least one of the web pages without rendering the at least one web page to identify scanned web page information. In addition, the method can involve rendering the page code of the at least one web page. In such a case, the results of the rendered page code comprise rendered web page information. Furthermore, the method can involve displaying an analysis of the website that includes a combination of scanned web page information and rendered web page information for the at least one web page.

In addition, a method automatically generating a site map that shows one or more parent and child relationships in the website using page rendering techniques can involve receiving a request to generate a site map. In this case, the request comprises one or more end user provided processing parameters, and an identified website. The method can also involve processing one or more web pages corresponding to the identified website in accordance with the user provided processing parameters. In addition, the method can involve rendering one or more of the one or more web pages. Furthermore, the method can involve generating a site map for display in a user interface. In this case, the site map shows one or more link relationships between a plurality of web pages in the website, and further shows rendering results for the rendered one or more web pages.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
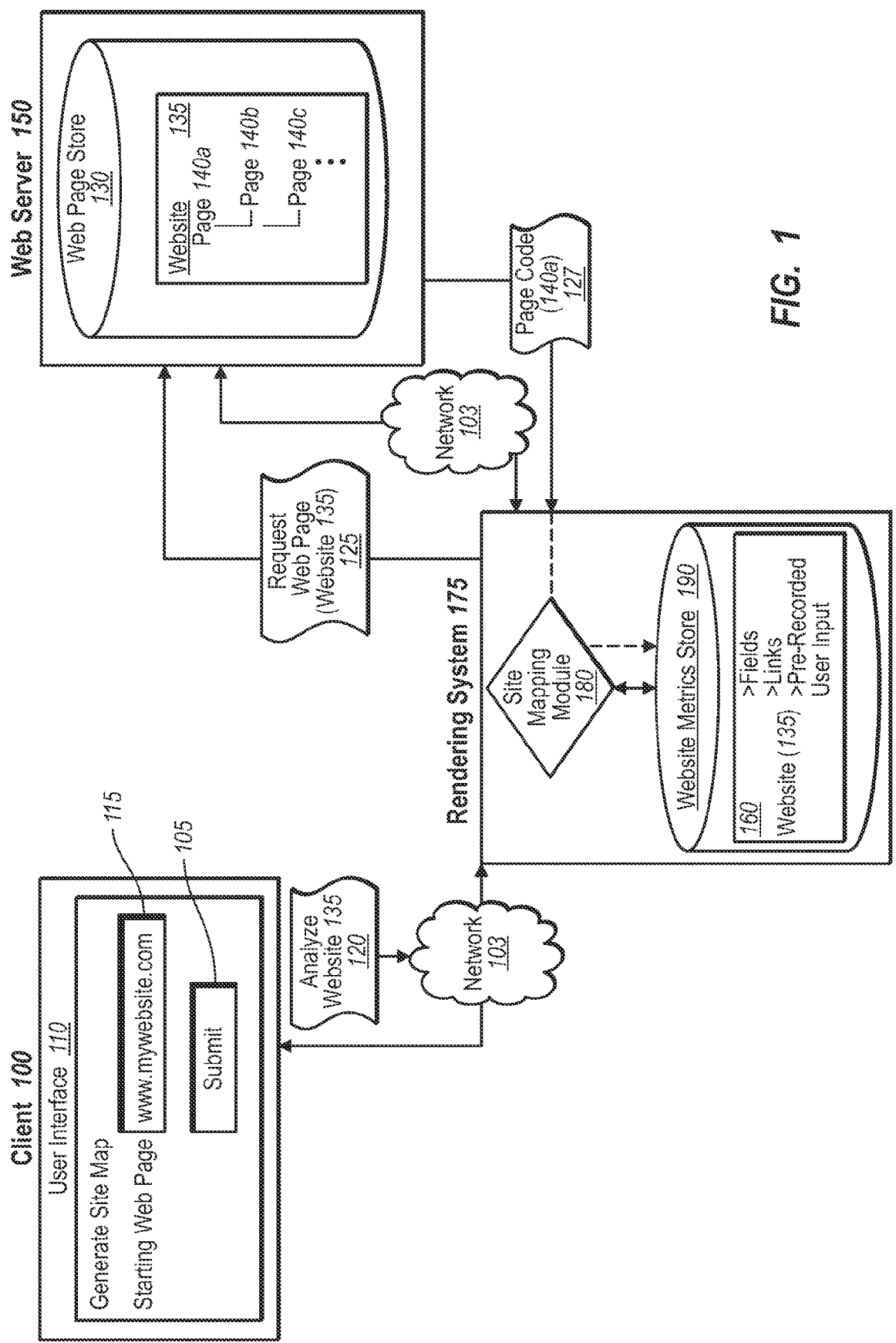
FIG. 1 illustrates an overview schematic diagram of a system for use in accordance with an implementation of the present invention.

Implementations of the present invention provide systems, methods, and computer program products configured to automatically and efficiently analyze a website, including generate a site map and performing review of the website content and function. In one implementation, a rendering system uses one or more web page review (or scan) and web page rendering techniques to identify and execute objects on web pages, including identifying and executing links between pages. The rendering system can also retrieve pre-recorded user input to progress past web pages with fill-in forms. These and other features allow the rendering system to not only generate an accurate site map for a website, if desired, but also determine important site health and optimization information about the website.

For example, the rendering system can scan the web page to check if various objects, such as links, metadata content, or analytics source code (e.g., third party code), are complete and correct in each web page (e.g. GOOGLE ANALYTICS, SITECATALYST, HBX, etc.) Such scanning can also allow the rendering system to find and store various variables associated with particular objects. For example, the rendering system can determine which tracking pixels are present in the page and the values of various variables associated with a tracking pixel, such as "pagename," server, channel, campaign, events, products, property, "evar," and version. Furthermore, the rendering system can perform other functions such as checking the spelling of text on the web page, checking the spelling of links to other content, or checking to see if other linked-to content was received and rendered, or received and rendered in the appropriate time.

As understood more fully herein, the rendering system can also render the web page code when processing the website, rather than just scanning or reviewing the HTML text (or relevant type of source code). This allows the rendering system to not only read the web page code, but also identify if the web page code is working properly. Along these lines, rendering allows the rendering system to access and execute embedded or linked routines, and further access dynamic content that might only be obtained when rendering the web page. This allows the rendering system to thus obtain a complete picture of each web page in any website being processed, and allows a website operator to more easily understand and evaluate code (e.g., third party analytics code, or tags for the same) deployed on the website, or in a particular web page.

In addition, these and other features allow implementations of the present invention to provide a website agent (e.g., owner/operator) with a report that comprises a score about various features in the website. In one implementation, the score can be configured to indicate the extent to which content in a given web page (or the website generally) is consistent with metadata information, such as key word or web page descriptions in the metadata tags. Along these lines, the score (or report generally) can indicate the extent to which web page content is consistent with the website agent's purchased key words used in advertising (e.g., GOOGLE ADWORDS).

Also along these lines, implementations of the present invention understood herein can be used to compare various findings with expected standards. For example, a system in accordance with an implementation of the present invention can identify the website's privacy policy, and then analyze form content to determine if the form's requests are consistent with the privacy policy. Additionally, the system can compare content, form, and execution of text, images, and third party code on a given web page with industry standards for web page/website optimization (i.e., optimization "best practices.") Furthermore, the system can compare the relative amount of text information and amount of image information on a given web page or website with other expected values (e.g., industry standards) to provide a "page weight" for a given web page. These and other features are described more fully below.

For example, FIG. 1 illustrates a schematic diagram of one or more components and modules that can be used to automatically analyze a website, such as pursuant to creating a site map, using a combination of web page scanning and web page rendering techniques. As a preliminary matter, one will appreciate with reference to the results and features previously described that the functions of web page scanning and web page rendering can be applied broadly. Nevertheless, for purposes of convenience in description, the following text and figuers describe the inventive website analysis mechanisms primarily with respect to generating a site map.

In addition, regardless of the type of results sought using these inventive mechanisms, one will appreciate that the architectural layout show in FIG. 1 is only one possible implementation of the present invention, and this layout is not required in all cases. For example, FIG. 1 shows that rendering system 175 is in communication with client 100 and web server 150 via one or more connections over network 103, such that the rendering system 175 is an intermediary (e.g., hosted by a third party). Alternatively, rendering system 175 can comprise one or more sets of components and modules that reside and/or are installed on client 100 and/or web server 150.

Figure 2:
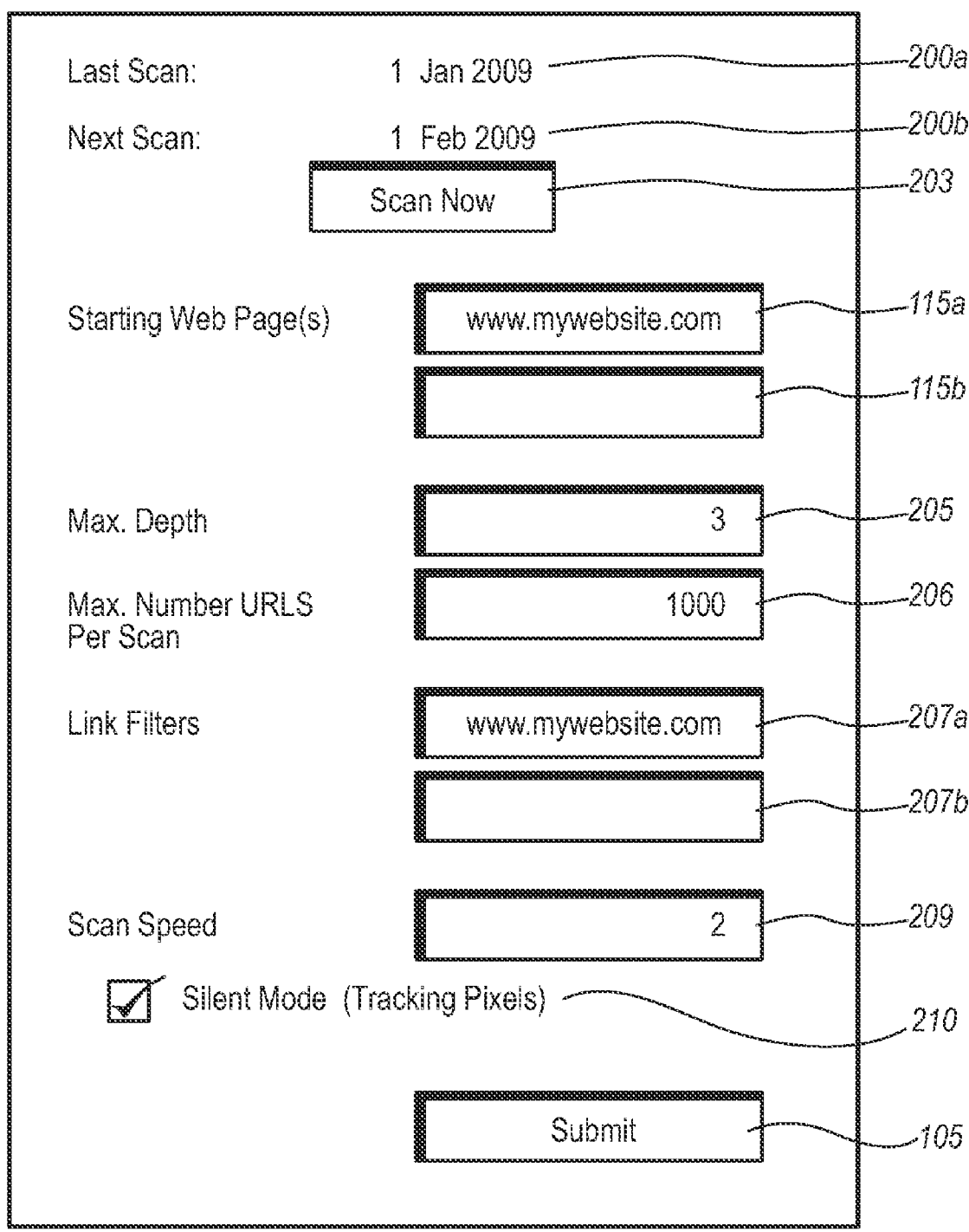
FIG. 2 illustrates an exemplary user interface for use in requesting a site map in accordance with an implementation of the present invention.

In any event, FIG. 1 shows that an end user can use client system 100 to analyze (e.g., map, detect health) one or more web sites (or corresponding web pages) hosted at web server 150 using rendering system 175. To enable the user's directions, FIGS. 1 and 2 show that client 100 can provide one more user interfaces 110 that allow a user to fill out one or more fields for submitting to rendering system 175.

FIG. 1 also shows that web server 150 and rendering system 175 can comprise one or more components and/or processing modules that store, process and/or otherwise handle the requests executed through user interface 110. For example, FIG. 1 shows that web server 150 can comprise one or more local or remote web page stores 130 for hosting various one or more websites 135. For purposes of this specification and claims, a website 135 will be understood as a collection of web pages 140 that are stored on or otherwise accessible through web server 150. In most cases, the web server 150 and corresponding website(s) 135 and/or web pages 140 will be that which the end-user owns or operates.

In addition, FIG. 1 shows that rendering system 175 can comprise one or more site mapping modules 180 (or "analysis modules"), and one or more website metrics stores 190. In general, site mapping module 180 can comprise one or more sets of computer-executable instructions for processing analysis (e.g., site-mapping) requests, and for analyzing web page code. In addition, website metrics store 190 can comprise one or more components or modules for storing the results of any analysis by site mapping module 180, as well as for storing other metrics or characteristics for a particular web page that site mapping module 180 might use in its analysis.

Thus, when a user desires to perform analysis of a website 135, the end user can effectively engage rendering system 175 through user interface 110. As a preliminary matter, the end user can access the user interface 110 through any number of means, mechanisms, or devices. In one implementation, for example, the user can invoke the user interface 110 using a client 100 executable application, which, in some cases, can further result in a set of requests and responses with rendering system 175 to provide or enable use of user interface 110 (graphical or otherwise). In another implementation, the user accesses user interface 110 using an internet-enabled application that requests executable code from rendering system 175 through a mobile phone or other PDA (Personal Digital Assistant), a laptop, or other specialized computing device.

However accessed, FIG. 1 (and FIG. 2) shows that user interface 110 can provide the end-user with a number of different options for analyzing a particular website 135. For example, FIG. 1 shows that the presented user interface 110 can comprise at least a modifiable web page field 115, and a submit button 105. In the web page field 115, an end-user (e.g., the owner of the website) can enter the URL (uniform resource locator) of the website of interest to be scanned for a site map. FIG. 1 further shows that the user can then execute the request to scan the web pages associated with the URL by selecting the submit button 105. Selecting the submit button 105 in this case results in client 100 sending one or more requests 120 to be handled by rendering system 175.

FIG. 1 shows that site mapping module 180 can then receive the request 120 and begin processing, pursuant to generating the requested site map and/or performing the requested analysis. In the illustrated case, site mapping module 180 identifies that the entered website received in request 120 is hosted at web server 150. Accordingly, FIG. 1 shows that site mapping module 180 can then send request 125 to web server 150 for a set of one or more web pages associated with website 135. Web server 150 can then retrieve and provide web page 140 for analysis by rendering system 175. Upon completing the analysis, rendering system 175 (via site mapping module 180) can then provide results (127) back to client 100 through user interface 110.

Figure 3:
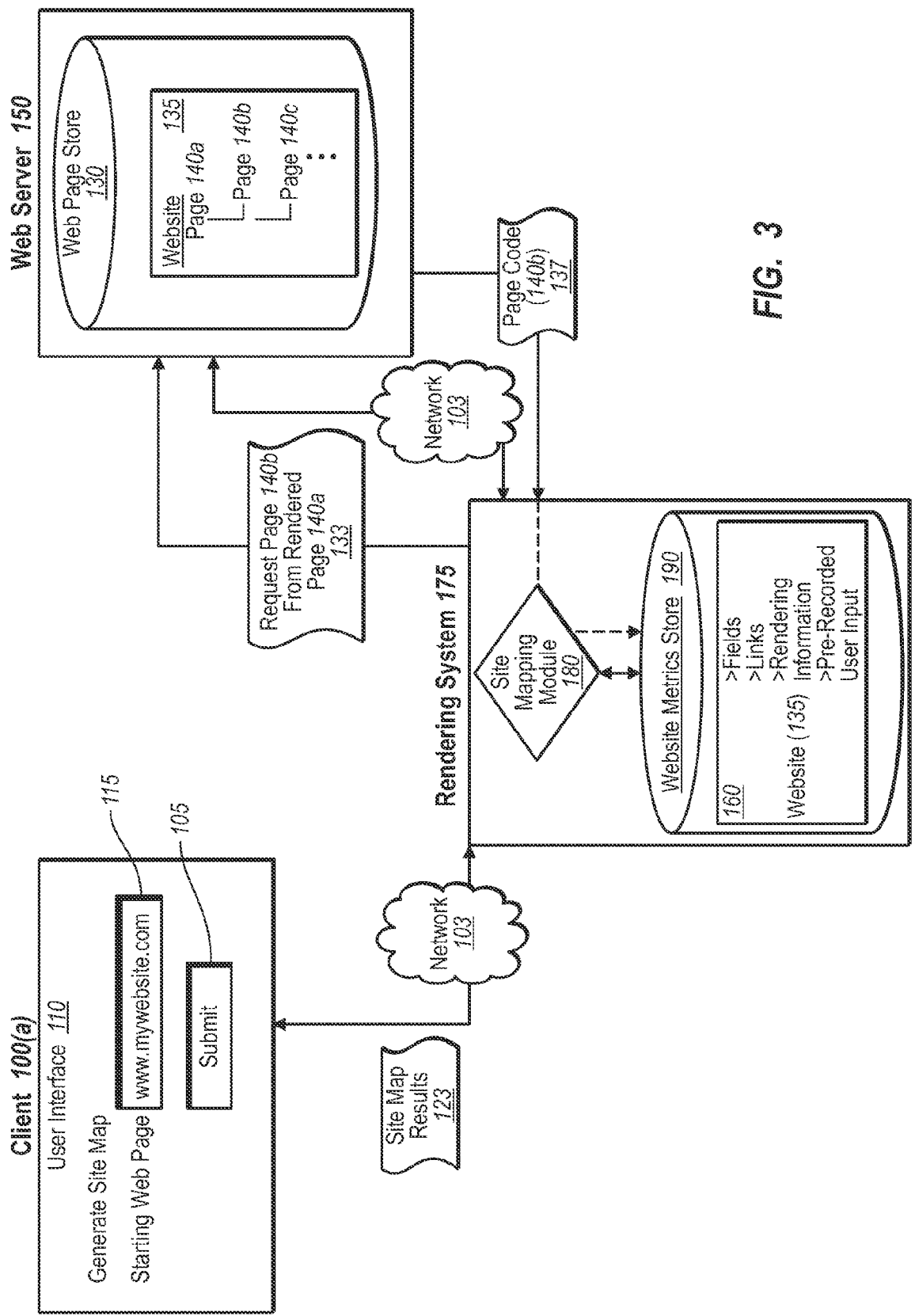
FIG. 3 illustrates the schematic of FIG. 1 in which the rendering system sends a request for and receives web page code as part of a process in accordance with the present invention.
Figure 4:
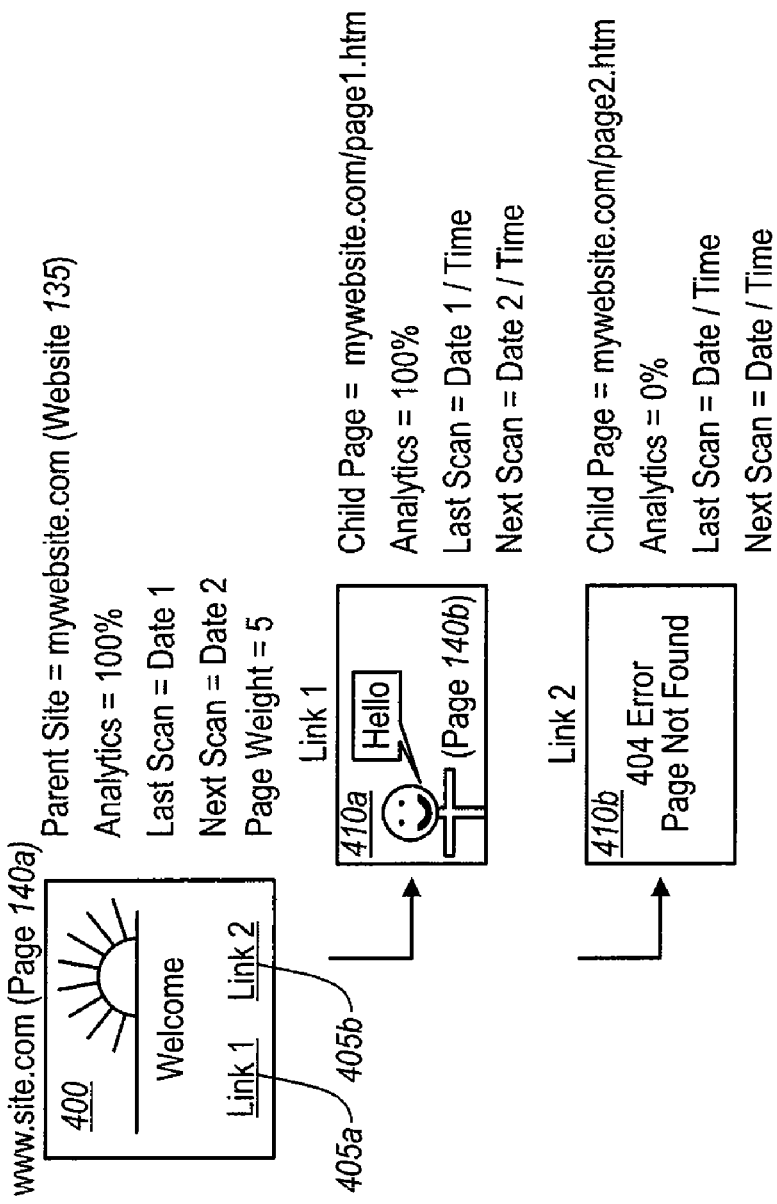
FIG. 4 illustrates another exemplary user interface displaying results of the processing in accordance with the present invention

FIGS. 2 through 4 provide additional details for an implementation in which the user can prepare a website analysis request, how the rendering system 175 analyzes and/or maps the relevant web page data, and how user interface 110 can present the mapping/analysis results to the user. For example, FIG. 2 illustrates more particular details on user interface 110, and some of the fields that rendering system 175 can provide to the user at client 100. Specifically, FIG. 2 shows that one implementation of user interface 110 can comprise a set of time stamps 200(*a, b*) that reflect the date of the last scan for the noted website, as well as a date for the next scheduled scan thereof. In one implementation, FIG. 2 shows that user interface 110 can also include a "Scan Now" button 203.

FIG. 2 further shows that user interface 110 can provide one or more "Starting Web Page" fields 115(*a, b*). For example, FIG. 2 shows that the end-user has entered "www-.mywebsite.com" into web page field 115*a*, and that field 115*b* is ready to accept any other entries for web pages of interest. In at least one implementation, therefore, rendering system 175 can receive multiple starting web pages to review at a time. Rather than separate field boxes, however, one will appreciate that field 115*a* can additionally or alternatively be configured to receive multiple webpage or website entries separated by a particular delimiter (e.g., comma or semicolon). Rendering system 175 can then "parse" or read the websites or web pages between the delimiters.

In addition, FIG. 2 demonstrates that user interface 110 can comprise a field 205 for "max. depth." In one example, the maximum depth value can limit the number of levels of a website that rendering system 175 crawls, or moves through. For example, FIG. 2 shows that a user has entered "3" into the maximum depth field 205. This means that, when rendering system 175 performs a scan, it will navigate through no more than the first three levels of the website. One will appreciate that, for a large website with many levels, rendering system 175 can complete a scan of the website much faster when the user specifies a maximum depth.

FIG. 2 also shows that user interface 110 can comprise a field 206 for limiting the "Max. Number URLs Per Scan." In some cases, for example, a website may still have a large number of child web pages, even when limiting the depth to a particular number of levels. Along these lines, FIG. 2 shows that a user has entered 1000 for the maximum number of URLs per scan (e.g. FIG. 2). Thus, when rendering system 175 has gone through (in this case) 1000 URLs listed in field 206, rendering system 175 can terminate the scan. Much like with limiting the maximum depth (i.e., field 205), limiting the maximum number of URLs per scan can be a convenient method of increasing the speed of the site scan, or for limiting the impact of the scan on the website's resources. Limiting the number of pages scanned can also be useful in a development environment where a website operator has changed the website and wishes to quickly determine if the website is functioning properly.

In addition, FIG. 2 illustrates that user interface 110 can include link filter fields 207*a*, 207*b*. In some implementations of the present invention, rendering system 175 can use a set of one or more link filters to determine if a link found in a rendered web page should be further processed and included in the generated site map. For example, in one implementation, rendering system 175 can compare each link found in a rendered web page against that specified in fields 207a and/or 207b to determine if the link should be processed. Along these lines, FIG. 2 shows a site scan of www.mywebsite.com and a link filter of www.mywebsite.com. In this example, all of the pages residing at www.mywebsite.com will be included in the site map, such as www.mywebsite.com/page1.htm and www.mywebsite.com/page2.htm. By contrast, the link www.foreignwebsite.com/page1.htm found in the web page will not be included in the site map.

One will appreciate that the user interface 110 can be configured so that the user can specify for each link filter whether to include links matching the filter (as described previously), or whether to exclude links matching the filter. In one implementation, for example, a website operator may want to exclude a certain portion of the website from the site map. The website operator can specify that he wants to exclude all links that match the filter www.mywebsite.com/development. In this example, www.mywebsite.com/page1.htm will be included in the site map, while www.mywebsite.com/development/page1.htm will not be included. Thus, in some implementations, a website operator can easily control which portions of the website are included in the site map by using link filters.

FIG. 2 further illustrates that user interface 110 can incorporate scan speed field 209. This refers to the possibility for rendering system 175 to overwhelm a web server by making too many webpage requests over a short period of time. Similarly, this problem can be magnified if multiple rendering systems are used to scan a website. In at least one implementation of the present invention, therefore, the scan speed in field 209 can represent the number of requests made to a web server (or for a website page) each second. In one example, the scan speed value can vary from 0.5 (very slow) to 5.0 (very fast).

In addition, a user can specify a scan speed that matches the web server's ability to fulfill normal user requests. For example, owners/operators of small websites with one server, shared resources, or a lot of dynamic content may want to choose a slow scan speed (e.g. 1.5 or fewer requests per second). Owners/operators of large websites with multiple servers and/or a lot of static content can choose a faster scan speed (e.g. 3.5 to 5.0 requests per second). One will appreciate that choosing a speed that is too slow will increase the time required for each scan to finish; while, a speed that is too fast may cause problems for the web server 150. Therefore, specifying the scan speed can enable the owner/end-user to prevent rendering system 175 from overwhelming the web server 150, or scanning the resident website(s) 135 too slowly.

Furthermore, FIG. 2 shows that tracking pixel silent mode field 210 can also be included in a user interface for rendering system 175. For example, website operators often embed tracking pixels in web pages so that they can track how visitors navigate the website. A tracking pixel can be a small image stored on a remote server that is referenced in a web page. When a web browser prepares a web page with an embedded tracking pixel for display, the web browser sends a request to the server where the tracking pixel resides. In some implementations of rendering system 175, when processing a page with tracking pixels, rendering system 175 can send a request to the server where the tracking pixel is located.

One will appreciate that a website operator may not wish to track the navigation of rendering system 175 as it crawls the website to generate a site map. Thus, in at least one implementation, a user can specify that rendering system 175 scan the website in "silent mode" by not causing any tracking pixels to "fire" or "increment" (i.e. request the tracking pixel from the remote server). When running in silent mode, rendering system 175 can identify tracking pixels but not request them from the remote server.

One will appreciate that, while FIG. 2 illustrates an interface to rendering system 175 using user interface 110, such an interface can be presented to a user in a variety of ways. For example, the interface can include any combination or arrangement of the elements shown in FIG. 2 as well as other elements not shown. In particular, the interface can include fields for "a date to begin scan," and "scan frequency field," so that a user can control when and how often scans will occur. The interface can also include an option to cease performing scans for a specified period of time, or cease performing them altogether. Further, the interface 110 can comprise options to measure and store various metrics associated with the web pages on the website. Thus, a variety of methods and means are available for a user to control how rendering system 175 scans a website.

As previously discussed, once the user has completed the relevant fields in user interface 110, the user can then submit the request to rendering system 175. For example, FIG. 1 shows that, upon selection of submit button 105, client 100 sends corresponding one or more requests 120 to rendering system 175 to analyze website 135, e.g., over network 103. In this example, the one or more requests 120 comprise the information that the user filled out in each of the fields 115, such as those shown in FIG. 2. FIG. 1 further shows that rendering system 175 then processes the request 120, such as through one or more site mapping modules 180. In one implementation, this processing by site mapping module 180 includes parsing the fields in the one or more messages 120 to reveal the user identified website 135 and scan options. This allows the site mapping module 180 to then request a first set of one or more web pages 140 from the corresponding web server 150 hosting the identified website 135.

For example, FIG. 1 shows that rendering system 175 sends one or more requests 125 to web server 150 for one or more web pages 140(a, b, c, etc.) corresponding to website 135. FIG. 1 shows that web server 150 processes the one or more requests 125, and responds with web page code for at least one of the one or more web pages. For example, FIG. 1 shows that web server 150 sends one or more messages 127 to rendering system 175 comprising source code for web page 140a, which, in this case, may be the initial landing page (e.g., www.mywebsite.com/index.htm). Rendering system 175 can then process the received source code through site mapping module 180.

There are a number of ways and means by which rendering system can process the received web page code. In at least one implementation, site mapping module 180 searches (or "scans") the raw text in the web page code to identify all links to other web pages in the received one or more web pages (e.g., from message 127). For example, site mapping module 180 can scan any received web page source code to identify text such as "href," "http," ".com," or the like, and then analyze the remaining adjacent portions of the text to determine if the text constitutes a link to another web page. Of course, one will appreciate that, while this approach might be able to identify links on a web page, it may not tell the user if the links (e.g., exit links) are actually accessible, or working properly.

Using this type of web page scanning technique, the one or more site mapping modules 180 can also determine if any of the page source code resembles expected metatags (or metatag content) for the web page. For example, as part of website optimization, the end user may have placed one or more text-based objects, such as metatags, in a given one or more web pages 140 to help a user easily discover a given web page 140 through a variety of search engines. Objects such as these can contain information about key word, or general descriptions of the web page. In some cases, the key words are words or phrases used by the website agent (owner/operator) for advertising, such as to advertise content on the given web page. In this example, web page scanning will generally identify web page content, including any metatags (and metatag content) that are found in raw web page HTML text.

There are of course other types of information that web page scanning can identify. For example, web page scanning (via module 180) can identify the types of information that the organization is requesting from a user in a web page's fill in forms, which the system can later compare with the organization's privacy policy. Web page scanning can also identify the presence and content of executable objects, such as third party executables (or links to executables) for advertising content, website analytics content, tracking pixel references, or the like. In addition, web page scanning can identify the relative amount of text and amount of information that the web page undergoing processes includes or otherwise references therein. Thus, scanning the web page 140 text as described above can result in "scanned web page information" that can be compared with expected analytic or optimization information for the given web page.

In addition to web page scanning techniques, and as previously discussed, the one or more site mapping modules 180 can also generate rendering information for each web page. The rendering system 175 can also compare this web page rendering information with expected analytic or optimization information to supplement or replace comparisons made with scanned web page information. For example, in addition to scanning the page code in message 127, site mapping module 180 can render the code of the web page. This can involve not only generating the image information for how web page 140a should be displayed on a display device, but also executing any scripts, routines, or programs that are embedded in or otherwise linked to or from the web page (140a).

When creating a site map, page rendering techniques allows site mapping module 180 to identify links not simply based on URL syntax, but based on whether the HTML rendering directed creation of a selectable link for the URL. Site mapping module 180 can then identify all links (including exit links) that are correctly processed as hyperlinks on the web page 140a rendering. Similarly, site mapping module 175 can record all additional requests for other web page source code that were initiated as a result of rendering the received web page code. In such a case, the site mapping module 175 can log the additional request(s) as a link off of the initially received web page 140, i.e., a child link.

One will appreciate that using the rendering approach can have the added benefit of identifying not only the link itself, but also if the link is working, and/or that the web page code can be rendered up to the point that the site mapping module 180 identified the link in question. Similarly, rendering allows the site mapping module 180 of rendering system 175 to identify any values returned by the embedded or linked routines (e.g., which may be provided through dynamic content). In one implementation, site mapping module 180 can perform both methods to identify information about a given web page (e.g., for finding parent/child link relationships, or other analysis information): scanning raw web page source code, and rendering raw web page source code.

Site mapping module 180 can then perform a number of additional processing functions on the discovered information. In at least one implementation, site mapping module 180 can store a snapshot image of the rendered web page in the one or more records 160 (e.g., rendering information, FIG. 3). In addition, site mapping module 180 can compare any identified link(s) with the relevant field information received in the one or more requests 120 (see also FIG. 2). Unless there is any reason to disregard a particular link (e.g., based on link filters 207a, 207b), site mapping module 180 can store the identified link as part of the record 160 for the requested website 135. For example, FIG. 1 shows that rendering system 175 includes "link" information for website 135 in record 160.

Furthermore, site mapping module 180 can further request web pages corresponding to each discovered link. As shown in FIG. 3, for example, upon discovering that web pages 140b and 140c, etc. are linked to web page 140a, rendering system 175 sends one or more additional requests 133 to web server 150 for a next web page 140b (e.g., over network 103). In this case, the newly requested web page 140b is linked to the initially received web page 140a on website 135. As such, FIG. 3 shows that web server 150 sends the web page 140b source code back to rendering system 175 via one or more corresponding messages 137. As with web page 140a, rendering system 175 can then process the received source code (i.e., review source code text, and/or render the web page code) for web page 140b to identify any further child links off of web page 140b. Rendering system (i.e., via site mapping module 180) can continue this for each of the discovered links.

In some cases, as the rendering system 175 site module 180 is processing a given web page 140, the site mapping module 180 may be unable to determine or follow any child links from web page scanning or web page rendering alone. For example, the given web page 140 may comprise one or more fill-in forms which, even if rendered, do not result in discovery of the next child page to be analyzed until hitting a "submit" button on the rendered page. To overcome these types of problems, implementations of the present invention further include mechanisms to obtain this type of fill-in information before or during processing.

In one implementation, for example, site mapping module 180 can prompt a user (e.g., through interface 110) for the information in the fill-in form. The user can then fill in some generic information for the form (e.g., in user interface 110) while site mapping module 180 records the user's keystrokes. The site mapping module 180 can then save the keystrokes and associate this as pre-recorded user input for this particular web page 140 in website 135. For example, FIGS. 1 and 3 show that record 160 comprises an entry for pre-recorded user input.

The site mapping module 180 can complete the recording process by, for example, identifying that the user has selected a button to continue and load the next web page. Then, site mapping module 180 can store the sequence of keystrokes in site website metrics store 190. When encountering the same web page with the same fill-in form again, site mapping module 180 can retrieve the user's solution from store 190 and automatically fill in the form. In another implementation, the user can provide an indication that the user will begin entering data into the web page. Upon receiving this indication, site mapping module 180 can begin recording the user's keystrokes. After entering data, the user can provide an indication that the user has finished entering data into the web page; site mapping module 180 can then store the user's keystrokes in store 190.

In yet another implementation, instead of storing keystrokes, site mapping module 180 can store the user input associated with the particular fields on the form. For example, if a form field requires a name and another field requires an email address, site mapping module 180 can store the user input associated with the name field and the additional input associated with the email address field. When site mapping module 180 encounters the same or a different form having a name and/or email address field, site mapping module 180 can supply the user input for the appropriate field. Thus, some implementations allow site mapping module 180 to navigate past a web form without requiring additional input from the user.

In addition, and as previously mentioned, the rendering system 175 can continually perform website health or optimization determinations on the scanned or rendered web page information with website metrics store 190. For example, site mapping module 180 can measure the time to obtain a web page (via message 127, 137) from web server 150, as well as the time to render the received web page 140. In addition, the site mapping module 180 can compare various expected metrics information for each page with one or both of the scanned web page information or the rendered web page information for each web page 140. In at least one implementation, this can involve comparing rendered or scanned web page information with expected standardized information about website/web page optimization "best practices." Such standardized information can relate, among other things, to the location, content, and format of objects, such as web page text or images, or web page executables, or any references thereto, in the web page.

Thus, site mapping module 180 can not only identify the presence and location or format of particular metatags in each web page 140, but also determine of the present, location, format, or content of such metadata conforms with a particular expectation, or industry standard. Similarly, site mapping module 180 can execute any scripts embedded in or linked to each web page 140 to identify if such code executed at all, and/or if the code executed to provide expected page names, or page descriptions, or the like. Similarly, site mapping module 180 can identify if the key words identified in these various scanning or rendering techniques are consistent with the web page content, or consistent with various key words that the website's agent uses in advertising (e.g., GOOGLE ADWORDS).

In addition, there are a number of different standards that the one or more site mapping modules 180 can use in the analysis. For example, beyond an industry standard for optimization best practices, the site mapping modules 180 could similarly use certain site-specific standards. In particular, the one or more site mapping modules 180 could use certain user input as a standard, such as user input about privacy policies, or other key words. Thus, in one implementation, the site mapping modules 180 analysis involves comparing fill-in form information requests with the supplied (or otherwise identified) privacy policy to determine if the organization is asking for information consistent with its own policies.

Another standard to which the one or more site mapping modules can refer can comprise an average amount of image data referenced or otherwise included on a particular web page. In particular, web pages that contain primarily text tend to load and render much faster than web pages that contain a large amount of image data. Thus, the site mapping modules 180 can also identify a standard based on an average amount of image data per web page. When preparing the rendered information, the one or more site mapping modules 180 can then determine whether the web page undergoing analysis has a relatively large amount of image data compared to the standard, and can thus ascribe a certain "page weight" to the web page. In turn, a web page that has more image data than the standard could be determined to have a page weight score that is "heavier" than perhaps the page weight score for another web page. Thus, one will appreciate that the site mapping modules 180 of rendering system 175 can effectively perform an audit of the website 135 and/or of each web page 140 relative to a variety of standards.

Once rendering system 175 completes processing the web pages for the indicated website, rendering system 175 can prepare the results for display to the end user. For example, FIG. 4 illustrates a schematic example of a display that can be provided by rendering system 175, such as after processing website 135. In particular, FIG. 4 illustrates a schematic of user interface 110 at client 100, after the user interface 110 has been updated (i.e., 110*a*) to reflect the processing results for website 135.

As shown, user interface 110*a* illustrates that the generated site map includes an image file 400 representing the rendered form of the initial page 140*a* in website 135. FIG. 4 also shows that this page image 400 is linked to two other child pages 140*b* and 140*c*, which, according to the visible site map, are accessible via hyperlinks 405*a* and 405*b* shown in the rendering 400. FIG. 4 also shows what the child pages 104*b* and 104*c* look like via displayed image files 410*a* and 410*b* corresponding to the page renderings.

One will appreciate that, in at least one implementation, user interface 110*a* can display both web page scanning information, and web page rendering information. Specifically, the web page scanning information can include the layout of the website 135 site map or other metatag format, layout, or position information obtained during text scans of raw web page source code. By contrast, the web page rendering information can identify whether page code is correctly executable, such as by showing the rendered image of the web page, discovery of certain analytics upon executing scripts, web page code, etc. The web page rendering information can also identify page weight.

Along these lines, FIG. 4 shows that the render image 410*b* for child page 104*c* resulted in an unknown page rendering error. FIG. 4 also shows that the analytic data associated with child page 140*c* indicates that none of the analytics code expected to be found in child page 410*b* could be found. In this example, this could mean that the site mapping module 180 did access the web page source code, but, for some reason, an error in the source code prohibited the page from being rendered appropriately and allowing execution of all code in the page. Alternatively, this could mean that another network error prevented correct receipt of the web page 104*c* at all.

Since the analysis text displayed beside child page 104*b* indicated the date and time of the scan, the end user can diagnose what other errors, if any, in the network or system may have caused the page error displayed for image 410*b*. In contrast, FIG. 4 similarly shows the relevant data in text form beside rendered images for parent page 140*a* and child page 140*b*. In these particular cases, site mapping module 180 was able to find all of the expected analytics objects for each web page, and so displays the analytics score as "100%". Of course, site mapping module 180 could determine different partial percentage scores for the same even when completely obtaining, scanning, and rendering a given web page. This can occur when certain objects, such as metatags, are positioned, formatted, or written in a sub-optimal way, or when code in (or linked to) the given web page does not execute with the optimal result.

Specifically, the site mapping modules 180 may have executed one or more third party objects, but the results were inconsistent with standards or goals for the web page. Similarly, the site mapping modules 180 may have identified various key words used in advertising by the owner/operator of the website, but such key words were inapplicable or inconsistent in some way to the web page content. In such cases, the user interface 110a could display analytics scores such as 80% or 90%, or even provide letter grades, or other form thereof. In addition, these scores can relate to other analysis information described here with respect to page weight, implementation of organizational policy, or the like.

Accordingly, FIGS. 1 through 4, and the corresponding text, illustrate or describe a number of schematics, components, and modules that can be used to generate an effective site map for any particular website, or, alternatively, perform a broader analysis on multiple features. Specifically, one will appreciate that these schematics, components, and modules can be used to efficiently and immediately indicate to a user the health of the website, and provide indications about how well the website and its pages are running at various times.

Figure 5:
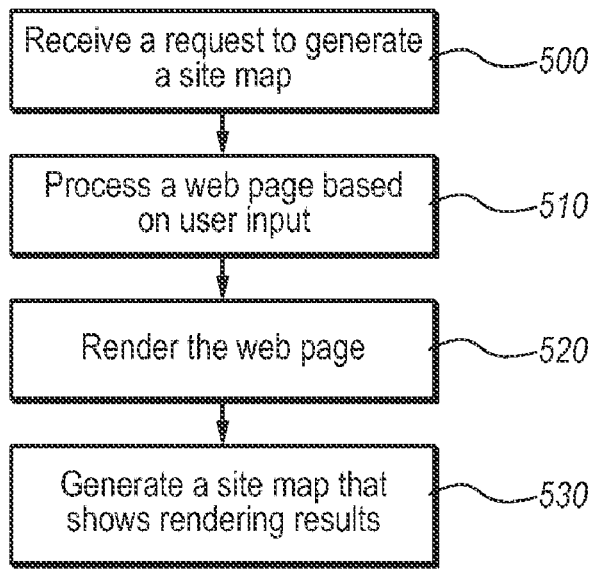
FIG. 5 illustrates a flowchart of a method in accordance with an implementation of the present invention of automatically generating a site map using page rendering techniques.
Figure 6:
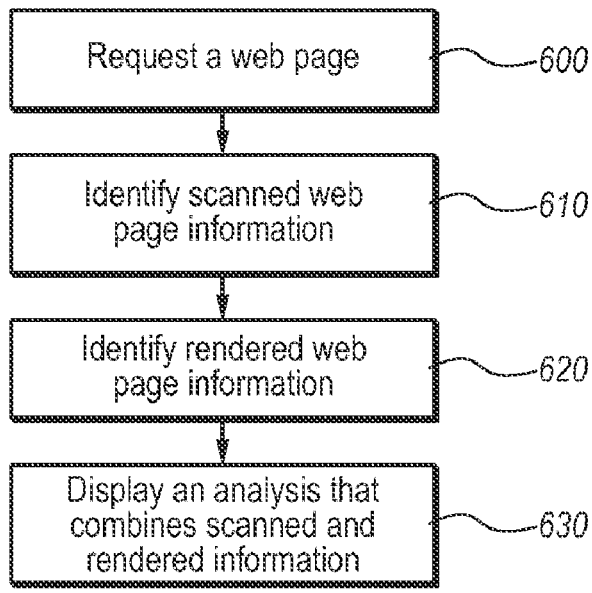
FIG. 6 illustrates a flowchart of a method in accordance with an implementation of the present invention of completing a site map using both page scan and page rendering techniques.

In addition to the foregoing, implementations of the present invention can also be described in terms of flowcharts comprising one or more acts in a method for accomplishing a particular result. Along these lines, FIGS. 5 and 6 illustrate flowcharts of computerized methods for automatically generating a site map in an efficient way. For example, FIG. 5 illustrates a flowchart of acts in a method for automatically generating a site map of a website using page rendering techniques. Similarly, FIG. 6 illustrates a flowchart of acts in a method of completing a site map using both page scan and page rendering techniques. The acts of FIGS. 5 and 6 are described below with respect to the components and diagrams shown in FIGS. 1-4.

For example, FIG. 5 shows that a method of automatically generating a site map using page rendering can comprise an act 500 of receiving a request to generate a site map. Act 500 can include receiving a request to generate a site map, wherein the request comprises one or more end user provided processing parameters, and an identified website. For example, FIG. 1 shows rendering system 175 receives one or more requests to analyze website 135 via one or more requests 120. As previously discussed, this information can be provided initially by user that fills in one or more fields in user interface 110 (see also FIG. 2).

FIG. 5 also shows that the method comprises an act 510 of processing a web page. Act 510 can include processing one or more web pages corresponding to the identified website in accordance with the user provided processing parameters. For example, FIG. 1 shows that one or more site modules 180 of the rendering system 175 can request and process web pages of the website identified by the user in one or more fields found in message 120 (which includes the fields shown in FIG. 2). As shown in FIG. 2, the one or more one or more fields can further instruct the rendering system 175 to process received web pages in accordance with any other depth, speed, or frequency parameters provided by the user (e.g., via message 120).

In addition, FIG. 5 shows that the method comprises an act 520 of rendering a web page. Act 520 includes rendering one or more of the one or more web pages. For example, FIG. 1 shows that rendering system 175 receives source code for web page 140a from web server 150 via one or more messages 127. In other cases, rendering system 175 might alternatively receive data in the form of an error message (e.g., a broken link or network failure) through a similar mechanism. In either case, site mapping module 180 renders the received data as it would ordinarily be displayed through, for example, a web browser. In one implementation, site mapping module 180 renders a received web page and also stores corresponding metrics information (e.g., rendering speed, analytics results) about rendering the received data in data store 190.

Furthermore, FIG. 5 shows that the method can include an act 530 of generating a site map that shows rendering results. Act 530 can include generating a site map for display in a user interface, wherein the site map shows one or more link relationships between a plurality of web pages in the website, and further shows rendering results for the rendered one or more of the web pages. For example, FIG. 4 illustrates the results of generating a site map from website 135 through user interface 110. As shown, the site map includes not only various parent/child relationships between web pages 140 in the website 135, but also images and analytic or metric data obtained when rendering data associated with each such web page. In some cases, such data is obtained only by executing various routines embedded in or linked to the web page during rendering.

In addition to the foregoing, FIG. 6 illustrates that a method in accordance with an implementation of the present invention of completing a site map of a website using both page scan and page rendering techniques can comprise an act 600 of requesting a web page. Act 600 can include requesting one or more web pages of a website pursuant to generating a site map of the website. For example, FIG. 1 shows rendering system 175 requests one or more web pages 140 from web server 150 pursuant to generating a site map for website 135.

FIG. 6 also shows that the method can comprise an act 610 of identifying scanned web page information. Act 610 can include scanning the page code of at least one of the web pages without rendering the at least one web page to identify scanned web page information. For example, upon receipt of message 127, the one or more site mapping modules 180 review the raw HTML source code to identify the position, format, and/or content of expected metatags, and can further review the text for any links that indicate the presence of any linked child web pages.

In addition, FIG. 6 shows that the method comprises an act 620 of identifying rendered web page information. Act 620 can include rendering the page code of the at least one web page, wherein the results of the rendered page code comprise rendered web page information. For example, as also discussed herein, the one or more site mapping modules can render the web page code received in message 127. This rendering can return additional information that supplements (or replaces in some cases) the scanned web page information. Such rendering information can include an image of the web page as it should be displayed (e.g., in a web browser), as well as the results of executing various routines that are embedded in or linked to the web page.

Furthermore, FIG. 6 shows that the method can comprise an act 630 of displaying an analysis that combines scanned and rendered information. Act 630 can include displaying an analysis of the website that includes a combination of scanned web page information and rendered web page information for the at least one web page. For example, FIG. 4 shows that the user interface 110a can be modified to show various scanned web page information, such as page name and parent/child relationships between web pages. FIG. 4 also shows that the user interface 110a can be modified to show various rendered web page information, such as an image of the web page as it would have been displayed on a web browser at a particular date and time. Of course, as discussed herein, the displayed analytics scores (e.g., percentages) can be based on a combination of both scanned page information and rendered page information.

Accordingly, FIGS. 1-6 provide a number of components and mechanisms for automatically, efficiently, and accurately analyzing a given website, whether creating a site map, or analyzing the website content in comparison with various standards. In addition to the foregoing, one will appreciate that implementations of the present invention can also be used to automatically review a particular website on a periodic basis. For example, and especially after all needed user input has been supplied pursuant to progressing through web forms, rendering system 175 can be configured to generate a new site map every few minutes, hours, or days, as desired.

Beyond merely providing a site map and web page rendering speeds, rendering system 175 can also inform the website owner about other items of interest related to website health. The rendering system 175 can also perform such audits of website health on a similarly scheduled basis (every few minutes, hours, or days, etc.) As previously mentioned, such site auditing/health/optimization information can include whether certain tracking code is found on particular web pages, and the extent to which the tracking code is loading properly. Such information can also include whether expected website objects (executables, key words, etc.) are present, optimized in terms of content and layout, and otherwise working as intended (or in accordance with industry standards or organizational policy).

One will appreciate that the rendering system can also be configured to alert the website owner/operator beyond the indicated user interfaces in the event it identifies certain failures in optimization, performance, or affiliation with standards. In one implementation, for example, rendering system 175 can be configured to automatically notify the website operator by e-mail, text message, phone message, or the like such that upon encountering an error or unexpected conditions with the website.

The embodiments of the present invention can comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computerized environment comprising a rendering system and a website having one or more web pages that have one or more parent and child relationships, a method of generating a site map of the website using both page scan and page rendering techniques, comprising:
   requesting, from a server, one or more web pages of an identified website pursuant to generating a site map of the website;
   receiving a response from the server, the response including page code that defines one or more web pages of the identified website;
   scanning the page code of at least one of the web pages without rendering the at least one web page during the scanning to identify scanned web page information;
   rendering all of the page code of the at least one web page, wherein the results of the rendered page code comprise rendered web page information; and
   displaying a site map of the website that includes a combination of scanned web page information and rendered web page information for the at least one web page, wherein displaying the site map further comprises:
      identifying an amount of image data to be rendered in the at least one web page;
      providing a value in the site map that indicates a comparison between the amount of image data and a defined average amount of image data found in web pages from other websites; and
      indicating whether content of the at least one web page is consistent with HTML meta tags included within the content of the at least one web page.

2. The method as recited in claim 1, wherein the value is a page weight selected from a plurality of page weights.

3. The method as recited in claim 1, further comprising generating the report for the at least one web page based on a comparison of expected information about the at least one web page with at least one of:
   the scanned web page information; or
   the rendered web page information.

4. The method as recited in claim 3, further comprising:
   determining from the comparison of expected information whether one or more key words used for advertising by an agent of the website were identified in the scanned web page;
   wherein the report reflects the determination for key words.

5. The method as recited in claim 3, further comprising:
   determining, based on the rendered web page information, whether one or more third party objects in the at least one web page were executed in accordance with the expected information;
   wherein the report reflects the determination for third party objects.

6. The method as recited in claim 3, further comprising:
   determining, based on the rendered page information, whether one or more expected values were passed during the execution of one or more executable routines found in the web page code;
   wherein the report reflects the determination of any passed values.

7. In a computerized environment comprising a rendering system and a website having one or more web pages that have one or more parent and child relationships, a method of the rendering system automatically generating a site map that shows one or more of the parent and child relationships using page rendering techniques, comprising:

receiving a request to generate a site map, wherein the request comprises one or more end user provided processing parameters, and an identified website;

requesting one or more web pages of the identified website;

receiving the one or more web pages, each web page comprising page code that defines the web page;

processing the one or more web pages corresponding to the identified website in accordance with the user provided processing parameters including:

scanning the page code of at least one of the web pages without rendering the at least one web page, during scanning, to identify scanned web page information;

rendering all of the page code of the at least one web page, wherein the results of the rendered page code comprise rendered web page information; and generating a site map for display in a user interface, wherein the site map displays the scanned web page information including one or more link relationships between a plurality of web pages in the website, and further displays:

the rendered web page information including rendering results for the rendered one or more web pages;

an indication of whether content of the at least one web page is consistent with HTML meta tags included within the content of the at least one web page; and an indication of whether the at least one web page requests user information that is consistent with a privacy policy, wherein the privacy policy defines the type of information that an owner of the website states it will and will not requests.

8. The method as recited in claim 7, further comprising:

identifying at least one parent web page in the identified website that requires user input to process the at least one parent web page; and retrieving pre-recorded user input for the at least one parent web page, wherein the pre-recorded user input allows the at least one parent web page to be processed.

9. The method as recited in claim 8, further comprising:

providing one or more interfaces that allow an end user to provide input for the at least one parent web page; and storing the user's input as the pre-recorded user input.

10. The method as recited in claim 8, further comprising, after completing processing of the at least one parent web page, automatically identifying one or more child web pages that are linked to the at least one parent web page.

11. The method as recited in claim 7, wherein the processing parameters comprise one or more of:

a level of depth for creating the site map; or a maximum number of web pages of the website to process when creating the site map.

12. The method as recited in claim 7, further comprising:

wherein the processing parameters comprise a set of one or more link filters; and excluding one or more identified links from the site map based on the link filter.

13. The method as recited in claim 7, wherein the processing parameters comprise one or more of:

a speed value that limits the number of requests made by a rendering system to the web server over a time interval; or a frequency for scanning the website.

14. The method as recited in claim 7, wherein the processing parameters comprise an indication to prevent logging requests for tracking pixels while rendering a web page.

15. The method as recited in claim 7, wherein the processing parameters comprise a selection for checking the spelling of text of a web page.

16. The method as recited in claim 7, wherein the site map further displays:

a visible rendering of each of the one or more web pages and a speed at which each web page was rendered.

17. A non-transitory computer-readable medium that, when executed cause one or more processors in a computer system to perform a method of automatically generating a site map of the website using page rendering techniques, comprising:

requesting, from a server, one or more web pages of an identified website pursuant to generating a site map of the website;

receiving a response from the server, the response including page code that defines one or more web pages of the identified website;

scanning the page code of at least one of the web pages without rendering the at least one web page to identify scanned web page information;

rendering all of the page code of the at least one web page, wherein the results of the rendered page code comprise rendered web page information; and displaying a site map of the website that includes a combination of scanned web page information and rendered web page information for the at least one web page, wherein displaying the site map further comprises:

identifying an amount of image data to be rendered in the at least one web page;

providing a value in the site map that indicates a comparison between the amount of image data and a defined average amount of image data found in web pages from other websites; and indicating whether the at least one web page requests user information that is consistent with a privacy policy, wherein the privacy policy defines the type of information that an owner of the website states it will and will not requests.

* * * * *